United States Patent [19]

Stoffel

[11] 4,404,597
[45] Sep. 13, 1983

[54] TWO DIMENSIONAL RADIOMETRIC COMPENSATION FOR SCANNING APPARATUS

[75] Inventor: James C. Stoffel, Rochester, N.Y.

[73] Assignee: Xerox Corporation, Stamford, Conn.

[21] Appl. No.: 326,724

[22] Filed: Dec. 2, 1981

[51] Int. Cl.³ .................. H04N 1/10; H04N 1/40
[52] U.S. Cl. .................... 358/293; 358/280
[58] Field of Search ........... 358/160, 163, 280, 282, 358/284, 293

[56] References Cited

U.S. PATENT DOCUMENTS

| | | | |
|---|---|---|---|
| 2,338,646 | 1/1944 | Kessler | 178/7.2 |
| 2,753,394 | 1/1956 | White | 178/7.1 |
| 2,981,793 | 4/1961 | Hurford | 178/7.2 |
| 3,610,119 | 10/1971 | Gerber et al. | 95/1 |
| 3,784,740 | 1/1974 | Copland | 178/6.8 |
| 3,800,079 | 3/1974 | McNeil et al. | 358/160 |
| 3,878,328 | 4/1975 | Marie et al. | 178/7.5 D |
| 3,902,011 | 8/1975 | Pieters et al. | 178/7.2 |
| 4,174,528 | 11/1979 | White | 358/293 |
| 4,200,934 | 4/1980 | Hofmann | 364/571 |
| 4,258,396 | 3/1981 | Scott | 358/293 |

Primary Examiner—Joseph A. Orsino, Jr.
Attorney, Agent, or Firm—Frederick E. McMullen

[57] ABSTRACT

A two dimensional radiometric compensation system for scanning devices of the type employing one or more lamps for sweeping a line-like beam of light across the document original to be scanned. Brightness profiles for various x and y points along the scan path and which are designed to compensate for deficiencies in the illumination components, are stored in memory. Where the scanning device comprises a raster input scanner with linear array for reading the document original, the brightness profiles are addressed in synchronization with the output of image signals by the array and the brightness compensating values obtained are used to modify the image signals output by the array.

2 Claims, 6 Drawing Figures

U.S. Patent  Sep. 13, 1983  Sheet 2 of 5  4,404,597
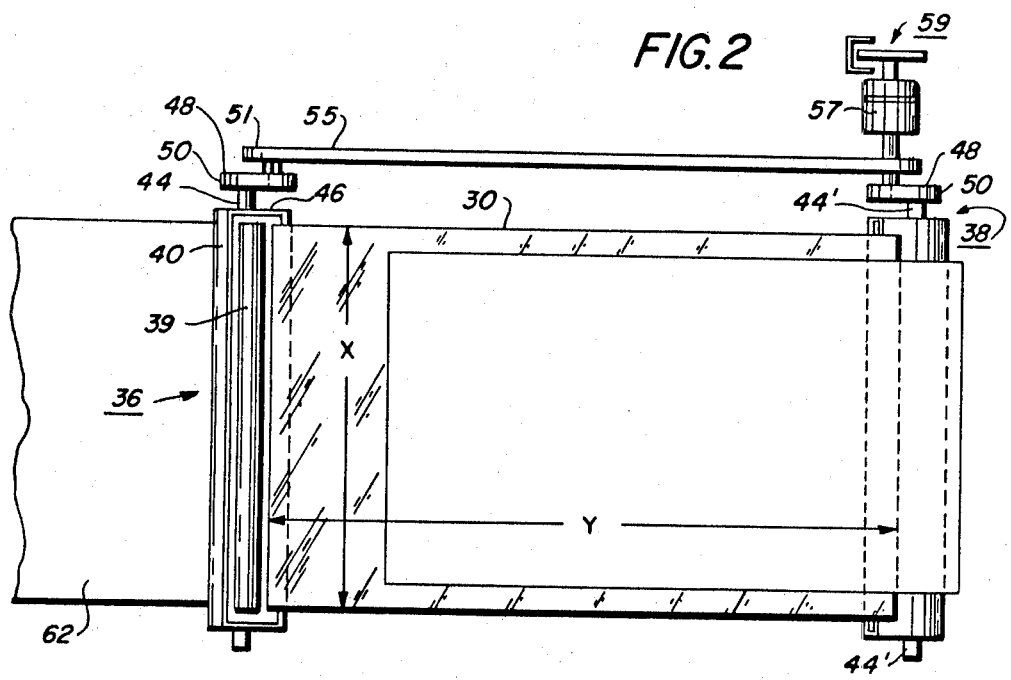
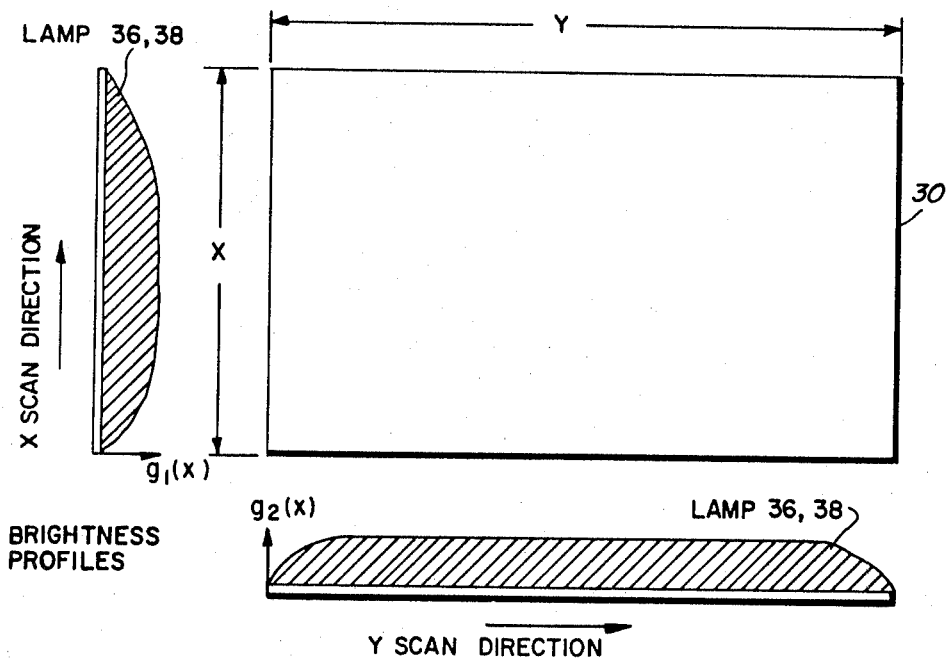

TWO DIMENSIONAL RADIOMETRIC COMPENSATION FOR SCANNING APPARATUS

The invention relates to a direct optics image scanning apparatus, and more particularly to a two dimensional radiometric compensation system for scanning apparatus.

Scanning apparatus of the type which raster scan a document original normally employ some arrangement for illuminating the document original. While illumination systems may vary in design and detail, all must face the problem of non-uniform illumination due to constraints inherent in the component parts that comprise the illumination system. For example, if more than one illuminating lamp is used, invariably the illumination output of the lamps differ. To assure uniformity in illumination, the lamps must be matched, a time consuming and relatively expensive procedure. And even in the case of one lamp, illumination intensity along the length of the lamp may be non-uniform, and such non-uniformity may be compounded by artifacts in the optical elements used to reflect and focus the image onto the scanning array.

The invention relates to a scanning apparatus comprising in combination: at least one array for scanning a document original line by line along a first axis, a plate for supporting the document original for scanning by the array; at least two independent scanning beams, each beam illuminating a line-like portion of the platen and the document original thereon; means for sweeping the beams across at least a portion of the platen along a second axis substantially perpendicular to the first axis, the beams cooperating to progressively illuminate the platen and the document original thereon; and means for correcting for deviations in the illumination intensities of the beams along both the first and second axes due to apparatus deficiencies and to overlapping of the beams including, memory means for storing signals for compensating for illumination deviations along both the first and second axes, means for addressing the memory means in synchronism with scanning by the array and sweeping of the beams to provide a corrective signal, and means to modify image signals output by the array in accordance with the correction signal.

IN THE DRAWINGS

FIG. 2 is a top view of the scanning apparatus shown in FIG. 1;

FIG. 3 is a graph showing typical illumination profiles along the X and Y scan axis for the scanning apparatus shown in FIG. 1;

Figure 1:
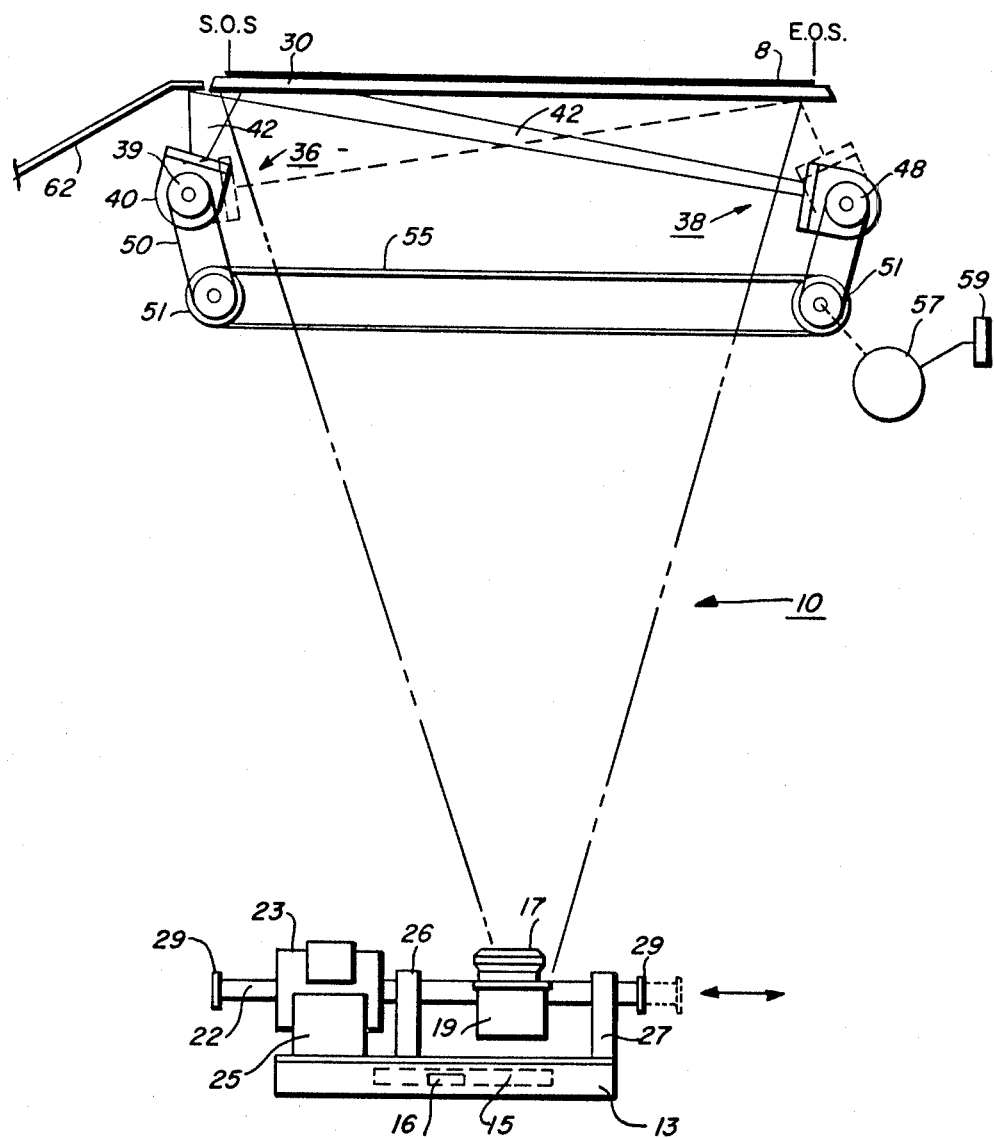
FIG. 1 is a wide view in cross section showing a raster scanning apparatus incorporating the radiometric compensation system of the present invention.

Referring to FIGS. 1 and 2 of the drawings, there is shown a raster scanning apparatus 10 of the type adapted to incorporate the radiometric compensation system of the present invention. Scanning apparatus 10 includes a suitable base 13 on which one or more linear arrays 15 are suitably supported in fixed position. Arrays 15 may comprise any suitable scanning array such as a charge coupled device (C.C.D.). One suitable array is model No. 1728 C.C.D. manufactured by Fairchild Corporation. The output of array 15 is clocked by pixel clock 16.

As will be understood by those skilled in the art, more than one array 15 may be used, it being understood that additional arrays serve to increase image resolution. In the event several arrays 15 are used, the array viewing fields may be abutted or overlapped, either electronically or by optical means, to prevent any gaps in the viewing field of the scanning apparatus 10.

A suitable lens 17 is supported above array 15 and in relatively close proximity thereto, lens 17 serving to focus the image rays reflected from the document being scanned onto the array 15. Lens 17 is supported in a block like structure, identified as lens block 19 herein, which in turn is fixedly attached to and supported by the armature shaft 22 of a linear type motor 23. Morot 23 is supported in stationary position on base 13 by support 25. A pair of spaced journal blocks 26, 27 provide further support for armature shaft 22, blocks 26, 27 being secured to base 13. Suitable journal or bearing means (not shown) in blocks 26, 27 permit reciprocating movement of armature shaft 22 in the direction shown by the solid line arrow of FIG. 1.

Linear motor 23 may comprise any suitable linear actuator, i.e. a voice coil, hydraulic cylinder, etc. Stops 29 on armature shaft 22 cooperate with the motor housing and end block 27 to limit reciprocating movement of armature shaft 22 and the lens 17 mounted thereon.

A substantially planar platen 30 for supporting the document 8 to be scanned is supported in preset spaced relationship above lens 17 and the scanning array 15. Platen 30 is formed from any suitable transparent material such as glass to permit the array 15 to view the document 8 as will be understood.

To illuminate the document 8 to be scanned, a pair of high intensity scanning lamp assemblies 36, 38 are disposed in predetermined spaced relationship below platen 30, lamp assemblies 36, 38 being located at opposite ends of platen 30 and out of the field of view of lens 17. Each lamp assembly 36, 38 comprises an elongated high intensity lamp 39 with cooperating curved reflector 40, the longitudinal dimension of lamp 39 being at least equal to the longitudinal width of platen 30 in the X direction. Reflector 40 is configured to reflect a wedge-like beam or bar of light 42 across the width of platen 30 in the X direction.

Preferably, reflector 40 serves as a support for the lamp assembly and the lamp 39 therewithin. Support shafts 44, 44' project from each end of reflector 40, shafts 44, 44' being received in bearings 46 mounted on a suitable frame member (not shown). Shafts 44, 44' and bearings 46 cooperate to support lamp assemblies 36, 38 in predetermined operating position relative to platen 30.

Support shafts 44, 44' of each lamp assembly 36, 38 are extended and have a drive pulley 48 mounted thereon. Pulleys 48 are coupled by intermediate drive belts 50 to a pair of rotatable main drive pulleys 51. A main drive belt 55 drivingly couples pulleys 51 together. A suitable scan drive motor 57 is drivingly coupled to one of the main drive pulleys 51. An encoder 59 which is drivingly coupled to motor 57, serves to generate a series of clock pulses representing movement of lamp assemblies 36, 38 in the scanning direction along the Y axis. As best seen in FIG. 1, lamp assemblies 36, 38 are prepositioned so that at the Start Of Scan position (SOS herein) illustrated, the beams of light 42 output by both lamp assemblies 36, 38 impinge on platen 30 at one end thereof. With operation of scan motor 57, lamp assemblies 36, 38 rotate in unison in a clockwise direction through an arc of approximately 90° to scan the beam of light 42 emitted therefrom across platen 30 in the Y direction to an End of Scan (E.O.S.) position.

As will be appreciated, the intensity of lamps 39 in lamp assemblies 36, 38, unless prematched, may be different. Additionally, the intensity of each lamp 39 along its axis may vary. Further, intensity variations may be created by the optical elements in the system such as lens 17 as well as by scanner operating conditions. And the illumination uniformity as the composite beam made up of light from both lamp assemblies 36, 38 may itself vary as the beams 42 scan across the platen 30. One example of such illumination variation is shown in FIG. 3 where a typical variation in illumination intensity along both the X and Y scanning direction is shown.

To accommodate variations in illumination intensity, an intensity calibration is run prior to scanner operation utilizing a suitable test pattern or document which is typically white. The results are committed to memory and as scanning of the document image takes place, the calibration data is withdrawn from memory and used to modify the image signal levels output by the scanning array 15.

Figure 4:
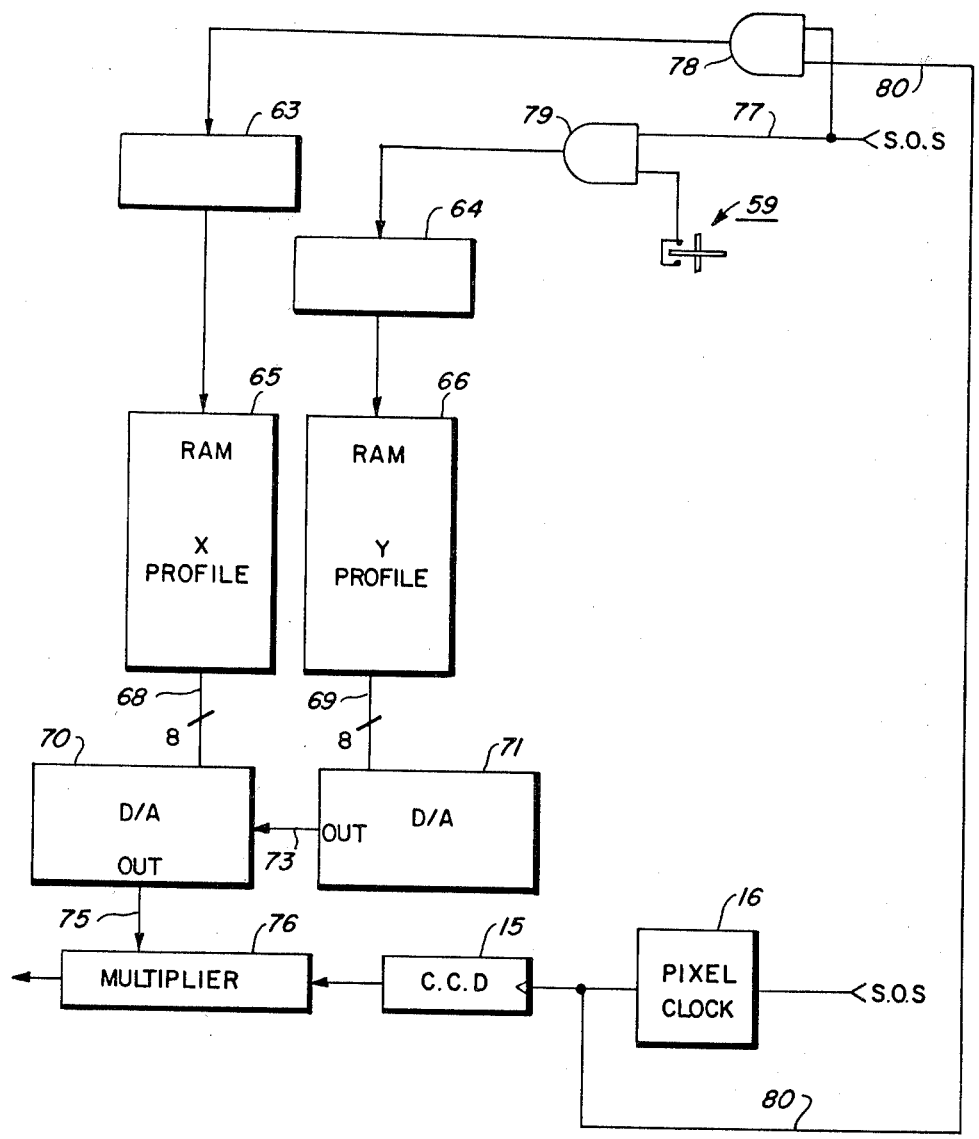
FIG. 4 is a circuit schematic showing the radiometric compensation system of the present invention.

Referring to FIG. 4, X illumination profile and the Y illumination profile memories, which may for example comprise RAMs 65, 66, are provided, RAMs 65, 66 being loaded previously with image signals derived from scanning a calibration or test document (not shown) as explained above. The output of RAMs 65, 66 are coupled by data buses 68, 69 to the input sides of suitable digital to analog converters 70, 71. The output of converter 71 is coupled by lead 73 to the reference port of converter 70. The output of converter 71 to output line 75 is passed to a suitable signal or pixel output modifier such as multiplier 76 where the calibration signal attenuates the image pixel information to modify the same for illumination deficiencies.

To correlate the output of RAMs 65, 66 with the pixel output of scanning array 15, RAMs 65, 66 are addressed through counters 63, 64 by the X axis pixel clock 16 and by the clock pulse output of Y axis encoder 59 on scan drive motor 57. For timing purposes a Start Of Scan (SOS) enabling signal is provided via control line 77 to control gates 78, 79. Clock pulses are input to control gate 78 through pixel clock lead 80 while the encoder derived clock pulses are input to control gate 79 through encoder clock lead 60.

In operation and as described heretofore, scanning apparatus 10 is operated at the outset to make one or more calibration scans. A first scan may be made along the X axis and the results representing the illumination profile along the X axis stored in RAM 65. A second scan is made along the Y axis and the results representing the illumination profile along the Y axis stored in RAM 66.

During operation of scanning apparatus 10 with a document 8 to be scanned resting on platen 30, on a Start Of Scan signal (SOS), linear motor 23 and scan motor 57 are actuated. Actuation of motors 23, 57, causes lens 17 and lamp assemblies 36, 38 to scan the document in synchronism with one another, lens 17 moving at a rate approximately one-tenth that of lamp assemblies 26, 28. At the same time, pixel clock 16 is energized to drive array 15. As the beams 42 of light generated by lamp assemblies 36, 38 sweep across platen 30 from one end to the other, the document 8 thereon is progressively illuminated and the illuminated portion focused by lens 17 onto scanning array 15. Array 15 responds to generate a succession of analog image signals, the voltage level of which represents the gray scale of the image area viewed. At the same time, RAMs 65, 66 are addressed by counters 63, 64 and the signal outputs therefrom, which are converted to analog by digital to analog converters 70, 71, are combined and multiplied with the image signal output of array 15 to provide image signals which have been compensated for illumination system deficiencies along both the X and Y scanning axes.

Figure 5:
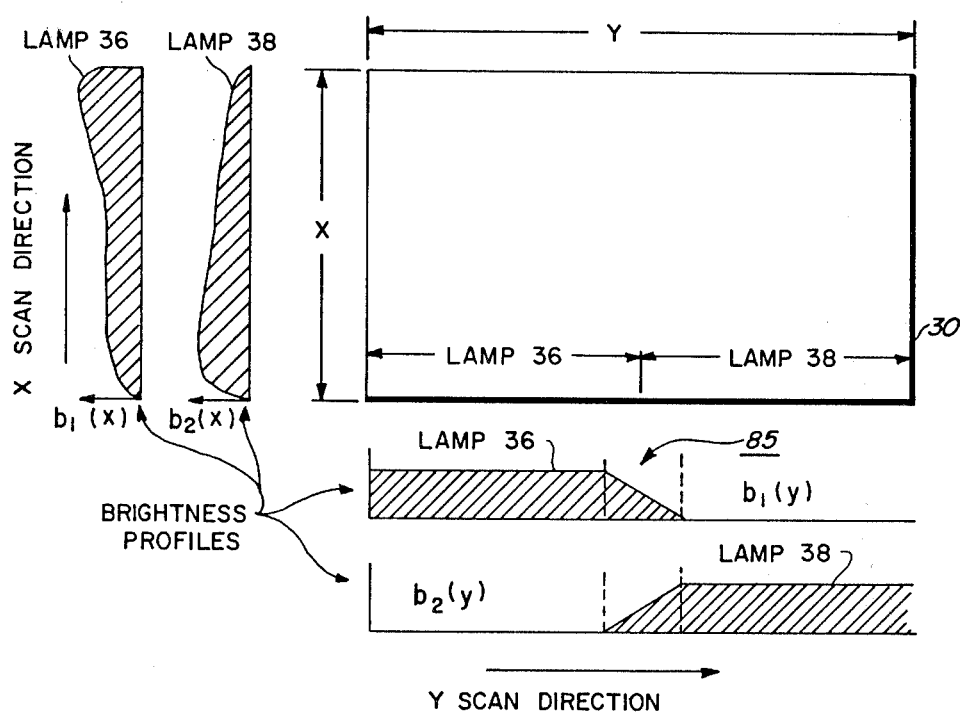
FIG. 5 is a graph showing the illumination profiles along the X and Y scan axis for a raster scanning apparatus of the type incorporating half platen scanning lamps.
Figure 6:
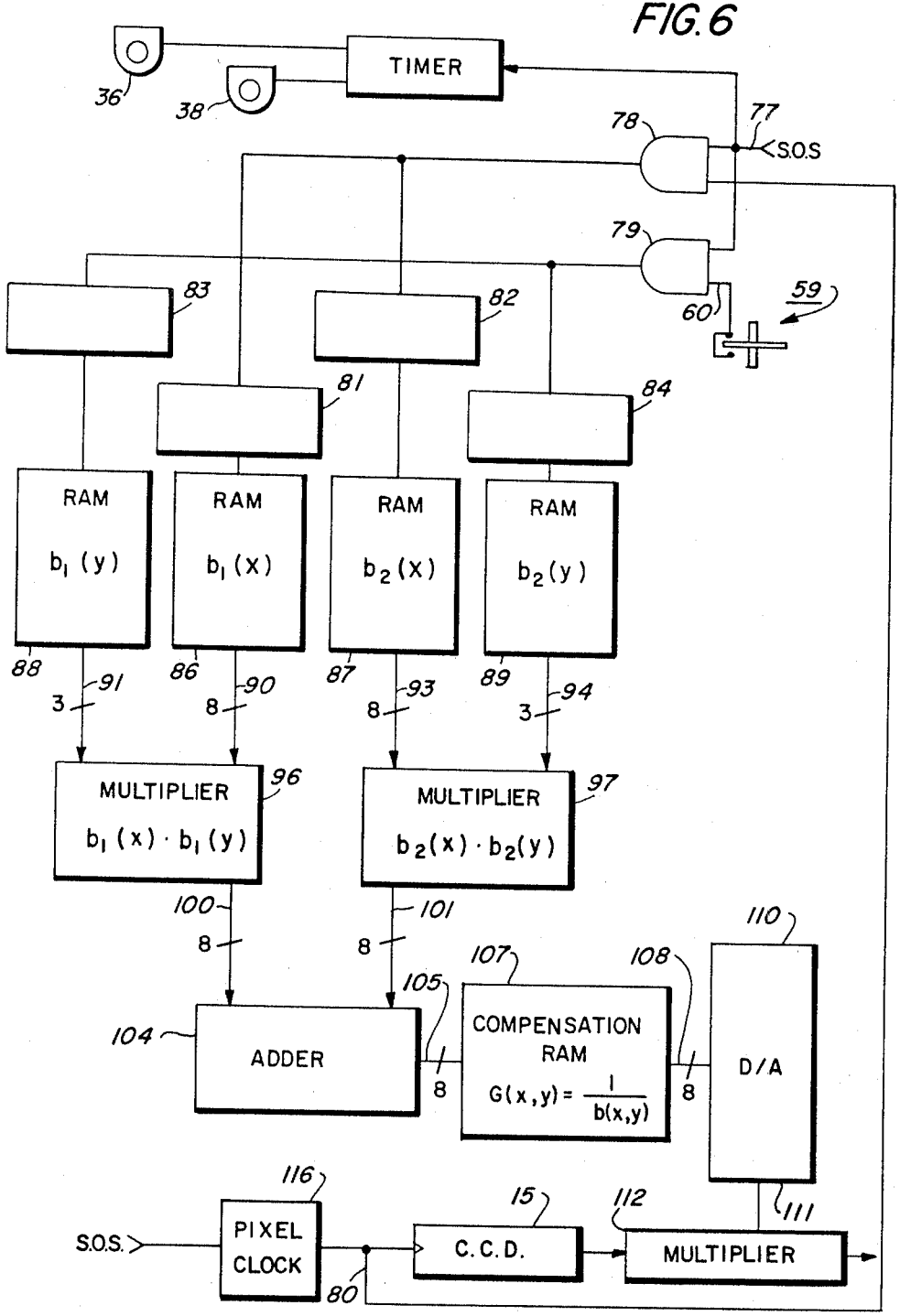
FIG. 6 is a circuit schematic showing a radiometric compensating system for the illumination system shown in FIG. 5.

In the embodiment shown in FIGS. 5 and 6, where like numbers refer to like parts, lamp assemblies 36, 38 are designed to illuminate only one half of the platen 20, that is, lamp assembly 36 illuminates platen 30 from the edge adjoining aperture 32 to a point just beyond the platen midpoint while lamp assembly 38 illuminates platen 30 from a point just ahead of the platen midpoint to the platen end. In the exemplary arrangement shown, a suitable lamp control incorporating a timing circuit triggered by the Start Of Scan signal (SOS) in line 77 is provided to energize lamp assembly 36 for a first portion of the scan and lamp assembly 38 for the remaining second portion of the scan.

It will be understood that lamp assemblies 36, 38 may be repositioned from the position shown in FIG. 1 to enhance illumination uniformity.

FIG. 5 illustrates a typical brightness profile for the aforedescribed arrangement, FIG. 5 illustrating brightness profiles for the lamp assemblies 36, 38 in the X direction and the Y direction, the latter including an overlap area 85 where both lamp assemblies are actuated to assure that no spot will be left unilluminated.

Referring particularly to FIG. 6, RAM memories 86, 87 and 88, 89 are provided for storing illumination data for lamp assemblies 36, 38 in the X and Y directions respectively. Address counters 81, 82, 83, 84 serve to address RAM memories 86, 87, 88, 89 respectively from the signal output of pixel clock 16 and encoder 59. Buses 90, 91 and 93, 94 couple the outputs of RAM pairs 86, 88, and 87, 89 to multiplier circuits 96, 97 respectively which serve to algebraically multiply the outputs of RAM pairs 86, 88 and 87, 89 together. The outputs from multiplier circuits 96, 97 are coupled by buses 100, 101 to Adder 104, which adds the output of multiplier circuits 96, 97. The summed output of Adder 104 is fed through bus 105 to a compensating RAM memory 107 which inverts the signal output of Adder 104 to provide a gain parameter sufficient to compensate for ilumination deficiencies. The analog signal output of compensating RAM 107 is fed through bus 108 to digital to analog converter 110. The output of converter 110 is passed via lead 112 to a multiplier 112 which combines the image signal value output by scanning array 15 with the illumination compensation signal output in lead 111.

Operation of the FIGS. 5 and 6 embodiment is essentially similar to that described heretofore in connection with the embodiment shown in FIGS. 1-4, the discrete illumination compensating values held in RAMs 86, 87, 88, 89 being addressed in synchronism with scanning movement of lens 17 and lamp assemblies 36, 38 by clock signals derived from pixel clock 16 and encoder 59. The signal output of RAM pairs 86, 88 and 87, 89 are multiplied by multipliers 96, 97, and thereafter summed by Adder 104 to provide a composite illumination correction signal. Following inversion by compensating RAM 107 and conversion to analog by digital to analog converter 110, the analog correction signal output to lead 111 is combined with the image signal output of array 15 by multiplier 112.

It will be understood that to reduce the size of RAMs 65, 66 in the FIGS. 1-4 embodiment, and RAMs 86, 87, 88, 89 in the FIGS. 5 and 6 embodiment, a single corrective signal may be provided for a block or group of image pixels, i.e. one corrective signal for every 32 image pixels. In that event a suitable Divider is provided, i.e. a divide by 32 Divider in the clock output leads 80, 60, of pixel clock 16, and encoder 59 respectively.

While the invention has been described in conjunction with an exemplary raster scanning apparatus 10, it will be nevertheless understood that the invention may be applied to a copier or reproduction machine of the type wherein a relatively moving slit-like beam of light is utilized to scan a document original situated on a transparent platen. In that type of machine, the image rays produced by scanning the document original are normally transmitted via an optical system onto a previously charged moving photoreceptor. There, the image rays discharge the photoreceptor to create on the photoreceptor a latent electrostatic image of the document original. The latent image so created is thereafter developed and transferred to an appropriate copy substrate material to provide a copy of the document original.

In that application, a suitable apertured mask may be provided to control the size and intensity of the light emitted by the machine's illuminating lamp or lamps along one axis (i.e. the scan axis). To control illumination intensity along the other axis (i.e. the cross scan axis), the radiometric compensating system of the present invention may be used.

In implementation, and as described heretofore, one or more calibration scans are run and the results stored in memory. During copying, the memory is addressed in timed synchronization with movement of the scan beam. The data output by the memory is used to regulate current input to the illumination lamp or lamps thus compensating for variations in illumination intensity.

While the invention has been described with reference to the structure disclosed, it is not confined to the details set forth, but is intended to cover such modifications or changes as may come within the scope of the following claims.

I claim:

1. In a scanning apparatus having at least one array for scanning a document original line by line along a first axis, a platen for supporting said document original for scanning by said array, at least two independent scanning beams, each of said beams illuminating a line-like portion of said platen and the document original thereon, and means for sweeping each of said beams across at least a portion of said platen along a second axis substantially perpendicular to said first axis, said beams cooperating to progressively illuminate said platen and the document original thereon, the improvement comprising:
   (a) first scanning beam generating means adjacent one end of said platen;
   (b) second scanning beam generating means adjacent the opposite end of said platen;
   (c) means for sweeping each of said beams output by said first and second scanning beam generating means across the entire length of said platen from said one end to said opposite end;
   (d) means for correcting for deviations in the illumination intensities of said beams along both said first and second axes due to apparatus deficiencies and to overlapping of said beams including memory means for storing signals for compensating for illumination deviations along both said first and second axes, means for addressing said memory means in synchronism with scanning by said array and sweeping of said beams to provide a corrective signal, and means to modify image signals output by said array in accordance with said corrective signal; said memory means including
      (1) a first memory for storing signals for compensating for illumination deviations of said scanning beams along said first axis;
      (2) a second memory for storing signals for compensating for illumination deviations of said scanning beams along said second axis;
      (3) first digital to analog converter means for converting the signal output of said first memory to an analog signal;
      (4) second digital to analog converter means for converting the signal output of said second memory to an analog signal; and
      (5) means for combining the signal output of said first converter means with the signal output of said second converter means to provide said corrective signal.

2. In a scanning apparatus having at least one array for scanning a document original line by line along a first axis, a platen for supporting said document original for scanning by said array, at least two independent scanning beams, each of said beams illuminating a line-like portion of said platen and the document original thereon, and means for sweeping each of said beams across at least a portion of said platen along a second axis substantially perpendicular to said first axis, said beams cooperating to progressively illuminate said platen and the document original thereon, the improvement comprising:
   (a) first scanning beam generating means adjacent one end of said platen;
   (b) second scanning beam generating means adjacent the opposite end of said platen;
   (c) means for sweeping each of said beams output by said first and second scanning beam generating means to substantially the midpoint of said platen;
   (d) means for correcting for deviations in the illumination intensities of said beams along both said first and second axes due to apparatus deficiencies and to overlapping of said beams including memory means for storing signals for compensating for illumination deviations along both said first and second axes, means for addressing said memory means in synchronism with scanning by said array and sweeping of said beams to provide a corrective signal, and means to modify imge signals output by said array in accordance with said corrective signal; said memory means including
      (1) a first memory pair for storing signals for compensating for illumination deviations of said scanning beam along said first and second axes;
      (2) a second memory pair for storing signals for compensating for illumination deviations of said second scanning beam along said first and second axes;

(3) signal processing means for combining the signal outputs of said first and second memory pairs; and (4) digital to analog conversion means for converting the signal output of said signal processing means to said corrective signal.

* * * * *